(12) United States Patent
Hallett (10) Patent No.: US 11,953,360 B1
(45) Date of Patent: Apr. 9, 2024

(54) FLOW MEASURING AND METERING DEVICE FOR FLOWABLE GRANULAR SOLIDS

(71) Applicant: Hallett's Hay and Seed, ltd., Carstairs (CA)

(72) Inventor: Richard Hallett, Carstairs (CA)

(*) Notice: Subject to any disclaimer, the term of this patent is extended or adjusted under 35 U.S.C. 154(b) by 0 days.

(21) Appl. No.: 18/299,740

(22) Filed: Apr. 13, 2023

(51) Int. Cl.
  *G01F 11/28* (2006.01)
(52) U.S. Cl.
  CPC .................... *G01F 11/282* (2013.01)
(58) Field of Classification Search
  CPC ....... B65G 11/00; B65G 11/20; B65G 11/206; G01F 1/002; G01F 1/56; G01F 13/001; G01F 11/282
  USPC ......................................................... 222/440
  See application file for complete search history.

(56) References Cited

U.S. PATENT DOCUMENTS

| | | | | |
|---|---|---|---|---|
| 307,629 A * | 11/1884 | Church | ................ | G01F 11/282 222/452 |
| 904,334 A * | 11/1908 | Kleppinger | ........... | G01F 11/282 222/445 |
| 1,149,442 A * | 8/1915 | Hewson | ................ | G01F 11/282 222/44 |
| 2,138,742 A * | 11/1938 | McBrayer | ............. | G01F 11/282 222/445 |
| 2,588,206 A * | 3/1952 | Clark | .................... | G01F 11/282 222/445 |
| 3,834,593 A * | 9/1974 | James | .................. | A01K 5/0275 222/440 |
| 4,380,309 A * | 4/1983 | Takahashi | ............ | G01F 15/005 222/DIG. 1 |
| 4,858,708 A * | 8/1989 | Kohno | ................... | G01G 13/16 177/25.18 |
| 2004/0188330 A1* | 9/2004 | Slawson | .................. | B01J 49/85 210/90 |
| 2023/0314203 A1* | 10/2023 | Strief | .................. | G01F 25/0092 73/1.36 |

FOREIGN PATENT DOCUMENTS

| | | | | |
|---|---|---|---|---|
| WO | WO-2009044224 A1 * | 4/2009 | ............. | C03B 5/235 |
| WO | WO-2012079809 A1 * | 6/2012 | ............ | G01F 11/282 |
| WO | WO-2012153145 A1 * | 11/2012 | ............... | B65B 1/06 |

* cited by examiner

*Primary Examiner* — Paul R Durand
*Assistant Examiner* — Michael J. Melaragno
(74) *Attorney, Agent, or Firm* — Lewellyn Law, PLLC; Stephen Lewellyn (57) ABSTRACT

A volumetric flow measuring and metering device for flowable solids as a flow passage through which a flow of bulk material may be passed. An obturating device is positioned at the bottom end of the flow passage and is movable in a linear direction toward and away from the bottom end. The obturating device is positioned relative to the bottom end of the flow passage at a distance that imparts a consolidated, column-like flow of the bulk material in the flow passage. A speed sensor operates to measure a speed of consolidated, column-like flow of the bulk material in the flow passage. A controller uses the speed data from the speed sensor to calculate a volumetric flow rate of the bulk material flowing through the flow passage. The obturating device can be selectively positioned to increase or decrease the volumetric flow rate of the bulk material. Other aspects are also provided.

20 Claims, 8 Drawing Sheets

FLOW MEASURING AND METERING DEVICE FOR FLOWABLE GRANULAR SOLIDS

TECHNICAL FIELD

The present disclosure relates generally to bulk material flow measurement and, more particularly, flow measuring and metering devices for flowable granular solids.

BACKGROUND

Bulk material flow measurement and metering devices exist. Some existing volumetric metering devices are based on a principle of a rotating meter roll with flutes or groves, or cups that meter the bulk solid as the meter roll turns. Other types of devices use a screw conveyor or auger to move material and use the speed of the screw conveyor or auger to determine a volumetric amount of material discharged from the conveyor.

A drawback to these existing devices is that it takes energy to operate the meter. A large amount of energy could be needed to rotate meters. Additionally, changing the volume requires the meter to rotate faster or slower, the meter must have different-sized flutes or cups, or the pitch of the auger flighting must be changed. Thus, in most situations, changing speed is not easy to perform and requires complicated variable speed drives. Changing the volume of meter rolls is also difficult. Another drawback of existing metering systems is that they do not confirm if they are functioning correctly. They could be plugged up or running empty and give no outward indication and must rely upon totally separate systems to detect problems.

Accordingly, there is a need and desire to have a bulk material flow measuring and metering device that overcomes the foregoing described and other drawbacks with existing measuring and metering devices.

SUMMARY

Advantages of features described in this disclosure may include, but are not limited to, those described below and herein elsewhere. The systems, devices, methods, and other features described herein can improve the capability of measuring bulk material flow and metering the flow of bulk material.

In some implementations, volumetric flow measuring and metering devices for flowable solids are provided that are energy efficient, have few moving parts, are easy to clean, and have a long service life.

In some implementations, volumetric flow measuring and metering devices for flowable solids are provided that can be used on farms and in the industry to measure and control the flow of things like grain, seeds, fertilizer, and plastic pellets. In many instances these granular products and moved or conveyed from containers, bins, silos, and trucks, using augers, ducts, conveyors, and tubes.

In some implementations, volumetric flow measuring and metering devices for flowable solids are provided that can be used in many different applications. The most simple as a standalone meter that could be fastened to the bottom of a container, e.g. bin, silo, or truck box, (there would have to be an opening or passage from the said container into the measuring container) then a simple toggle switch could control the flow of the product that was released. An instantaneous flow rate and totalized volume would be produced and displayed on a readout.

In some implementations, volumetric flow measuring and metering devices for flowable solids are provided that can be integrated together with other machines and systems to improve their accuracy, efficiency, and safety.

In various aspects, flowable granular solids move in a mostly vertical direction down through a measuring chamber (flow passage) under the force of gravity. This measuring chamber (flow passage) has smooth, parallel, straight sides of a known cross-sectional area. A conical obturating structure is located inserted into the bottom of the measuring chamber (flow passage), and the bottom discharge edge of the measuring chamber acts like a valve seat against the conical obturating device. The distance between the bottom discharge edge and the obturating structure can be manipulated to control or throttle the volumetric amount of granular bulk solids traveling through the measuring chamber (flow passage). This Restriction of the granular bulk flowable solids ensures that the measuring chamber (flow passage) is always filled to capacity.

Also because of the shape of the conical obturating device and the smooth straight parallel sides of the measuring chamber (flow passage), the column of bulk granular solids in the upper part of the measuring chamber is always filled to a similar density and gives the appearance of moving together in a uniform flow as a cohesive unit. This causes the bulk granular solids in the measuring chamber (flow passage) to appear visually as a single larger object moving through the measuring chamber (flow passage) because the density is consistent.

An optical flow sensor or other sensor is used to measure the speed of the moving column when viewed through a transparent material, embedded in the smooth, straight wall of the measuring chamber. The sensor should be located at least 1.5 times the diameter above the obturating cone-shaped obturating device. A cumulative distance measurement is also produced as the image of what appears as a solid is measured by the optical flow sensor as it passes the transparent window located in the measuring chamber. This measurement is calibrated against known time and distance units. These speed and length measurements are multiplied by the area of the measuring chamber to calculate the instantaneous flow rate and or the total volume of solids that have flowed through the measuring chamber (flow passage) in a given time. The flow rate and, or total volume can be manipulated by raising or lowering the cone-shaped obturating device by a mechanical means to different distances for different lengths of time.

In an aspect, a volumetric flow measuring and metering device for flowable solids is provided. The device has a flow passage that is generally arranged vertically and has opposite open top and bottom ends through which a flow of bulk material may be passed. A speed sensor is disposed to measure a speed of the bulk material flowing through the passage and output a data signal having information about the speed of the bulk material flow. An obturating device is positioned at the bottom end of the flow passage and is movable in a linear direction toward and away from the bottom end. An actuator is operably connected to the obturating device and operable to selectively position the obturating device relative to the bottom end of the flow passage. A controller is operably connected to the speed sensor and the actuator, and the controller operates to receive speed data from the speed sensor and to operate the actuator at least in part based on information contained in the speed data about the speed of the bulk material flowing through the passage.

In aspects, the flow passage can have a sidewall with a section thereof provided with a transparent material, and the speed sensor can be disposed exteriorly of the flow passage and aligned with the transparent material such that the optical sensor can operate to measure the speed of the bulk material flowing through the passage through the transparent material.

In aspects, the flow passage has a circular cross-sectional area. In other aspects, the obturating device is conically or frusto-conically shaped and its apex is positioned along a central axis of the flow passage. In yet further aspects, the volumetric flow measuring and metering device may further have a vibrator operably connected to the flow passage and being operatable to impart a vibrational force in the bulk material flowing through the flow passage.

In some aspects, the flow passage is provided by a cylindrically shaped tube. In other aspects, the speed sensor is an optical sensor, and the optical sensor can be an optical linear displacement sensor that operates to measure the speed of a surface moving relative to the sensor. In further aspects, the volumetric flow measuring and metering device may have a user interface operably connected to the controller.

Numerous additional objects, features, and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

For a better understanding of the invention, its operating advantages, and the specific objects attained by its uses, reference should be had to the accompanying drawings and descriptive matter in which there are illustrated embodiments of the invention.

DETAILED DESCRIPTION

Figure 1:
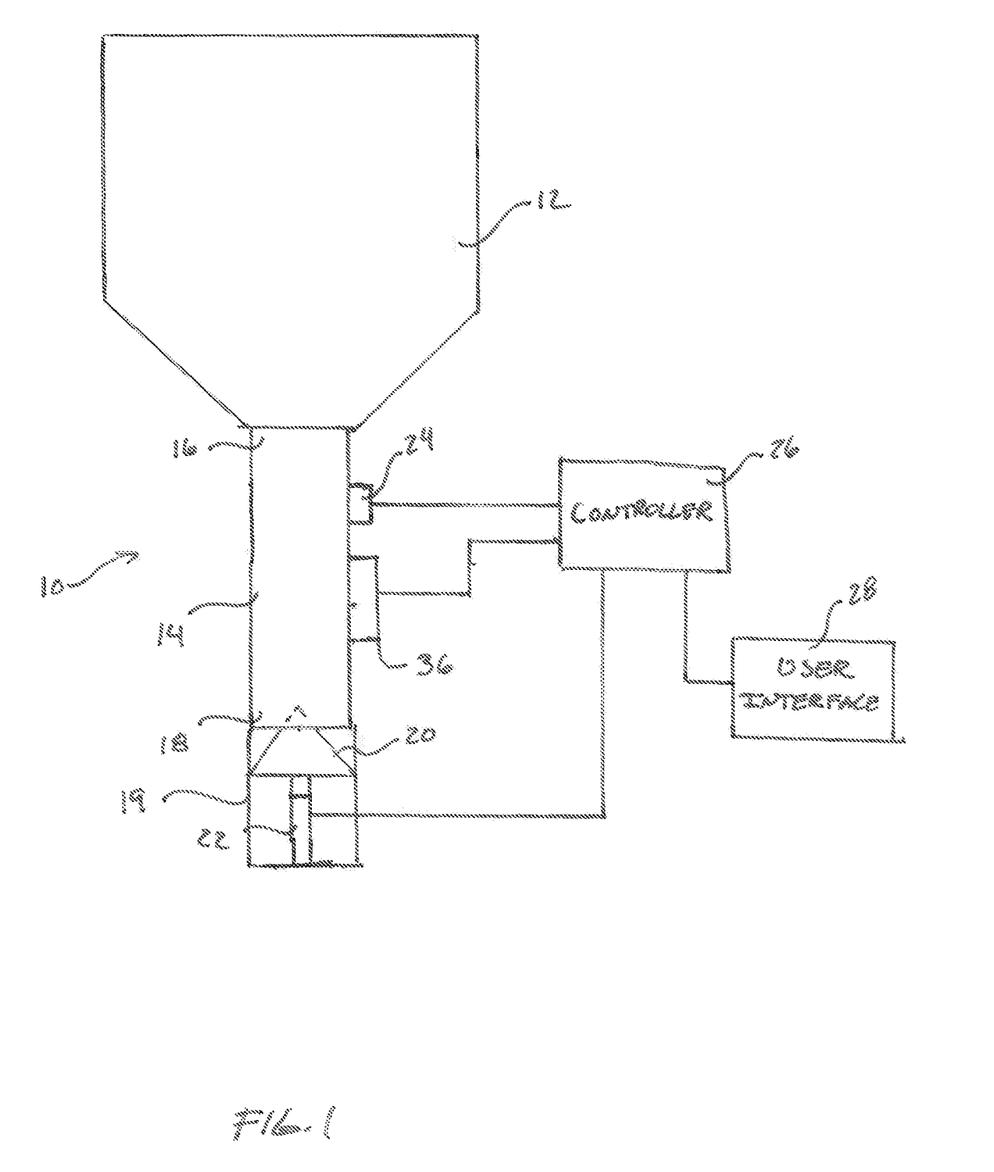
FIG. 1 is a schematic diagram illustrating one embodiment of a bulk material flow measuring and metering device.

FIG. 1 is a schematic diagram illustrating one embodiment of a bulk material flow measuring and metering device 10. In aspects, device 10 is configured and is operated to measure a flow of bulk material as it is discharged from a container or is moved in a process stream. In other aspects, device 10 is further configured to control or meter bulk material flow. As further discussed herein, device 10 is configured and operated to cause bulk material flowing therethrough to flow in a cohesive, consolidated state that is loose enough such that material can still flow under the force of gravity, but consolidated enough that the material generally flows as a continuous, consolidated column of material.

As a non-limiting example, device 10 is useful to measure and meter the flow of bulk material such as for example grain, seeds, fertilizer, and pellets. Device 10 can be implemented on various agricultural equipment and/or industrial equipment wherein there is a need to know the volumetric flow and/or the mass flow of bulk material and in certain applications control or meter the flow of bulk material.

In FIG. 1 device 10 is shown attached to a container, such as a hopper 12 for example that is configured to hold flowable bulk material. Conventionally, hopper 12 is configured with an opening at its bottom through which the bulk material contained in the hopper may flow through. As shown, device 10 is connected to the bottom of hopper 12 to receive bulk material as it flows out of the hopper opening. As will be discussed in further detail below, device 10 is configured and operates to measure bulk material flow from the hopper and can be further configured to control or meter the bulk material discharge from the hopper.

Device 10 has a structure 14, representatively shown here as a cylindrically shaped tube, that is attached at one end 16 to the bottom of hopper 12 to receive bulk material from the hopper into the tube. A metering device 19 is located at the opposite end 18 of the tube 18. The metering device 19 has a closure 20 and an actuator 22 is operatively connected to closure 20 and is operated to move closure 20 toward and away from end 18 of tube 14 to control the flow of bulk material through the tube. Device 10 further has a sensor 24 that is configured to measure the speed of bulk material as it flows through tube 14. Sensor 24 and actuator 22 are each operatively connected to a controller 26. Controller 26 is configured or otherwise programmed to receive flow data from sensor 24. The flow data received from sensor 24 can be used by controller 26 to control actuator 22 to position closure 20 to adjust or meter the flow of bulk material through tube 14. A user interface 28 may be provided and operatively connected to controller 26. User interface 28 may have a display for displaying various operational parameters and may have inputs allowing a user to adjust various operational parameters.

Figure 2:
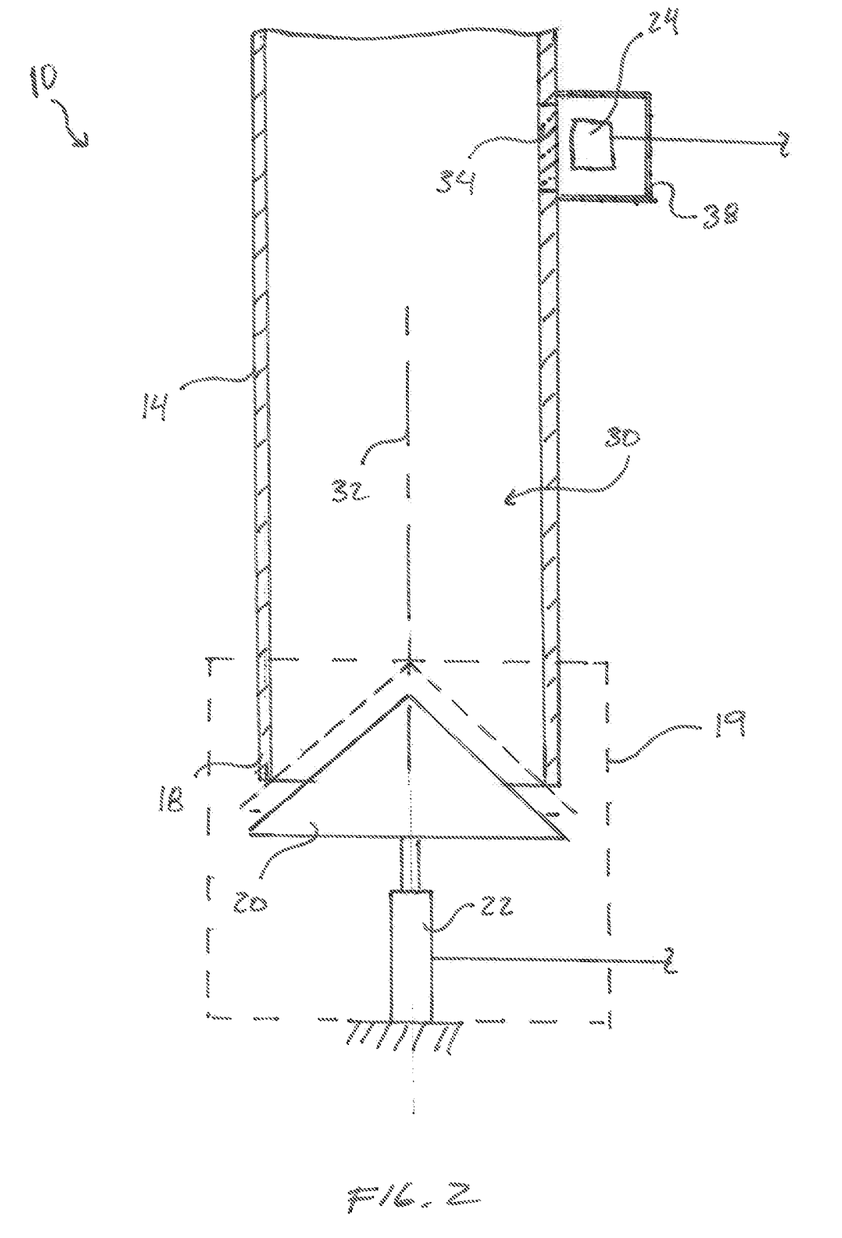
FIG. 2 is a schematic cross-sectional diagram of the bulk material flow measuring and metering device.
Figure 3:
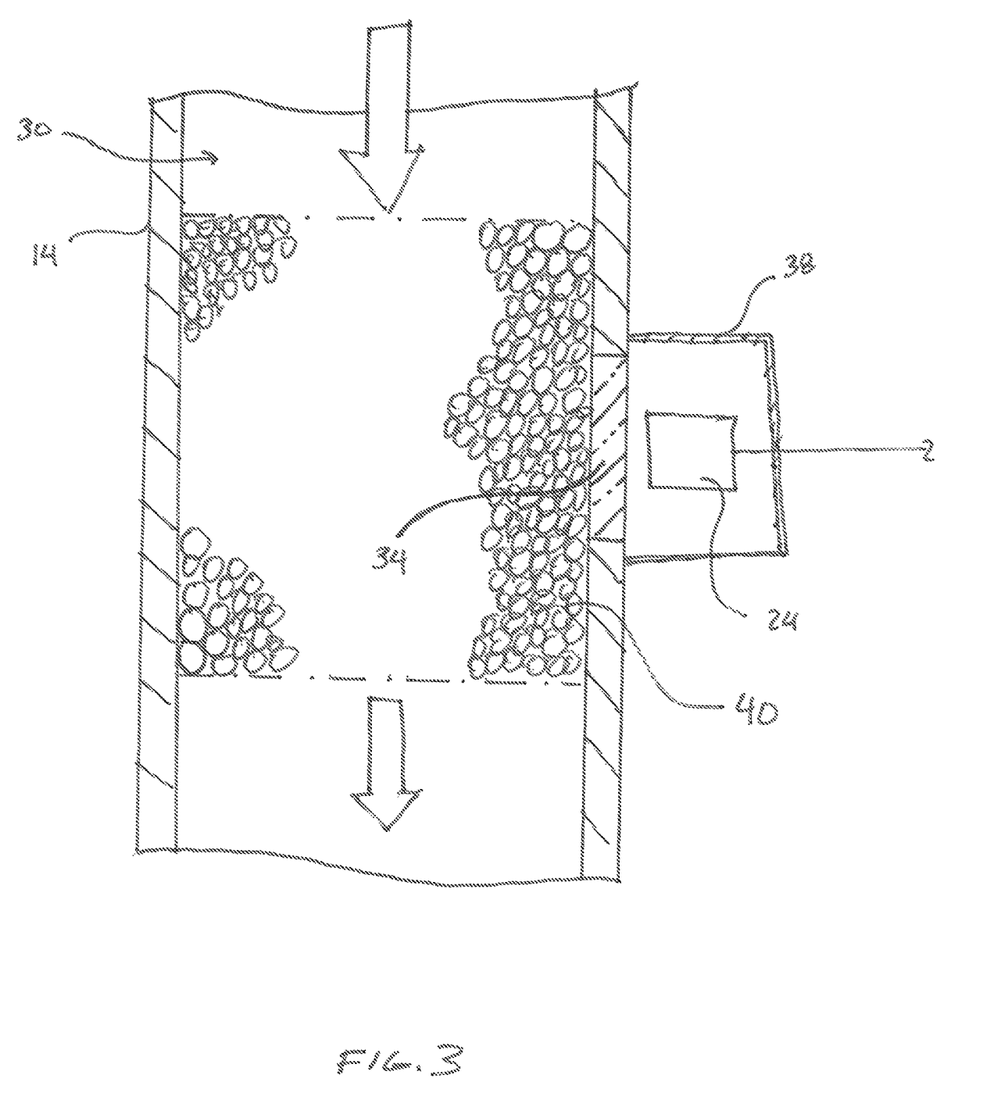
FIG. 3 an enlarged, schematic cross-sectional diagram of the bulk material flow measuring and metering device.

With additional reference to FIGS. 2 and 3, structure 14, again representatively shown as a cylindrically shaped tube has a straight flow passage 30 that extends through the tube. While structure 14 is shown as a cylindrically shaped tube having a circular cross-section, this structure is not so limited. Rather, any structure could be provided that has a flow passage for the flow of bulk material 40 wherein the flow passage is generally straight with parallel, smooth sides. However, for reasons discussed herein, it is preferable for flow passage 30 to have a circular cross-section, as representatively shown, to promote a cohesive, consolidated column-like flow of the bulk material in the flow passage. The material used to make the device should provide the interior wall surface of the flow passage with a low coefficient of friction to further promote a cohesive, consolidated column-like flow of the bulk material in the flow passage.

Closure 20 is disposed relative to end 18 of the tube and is supported for linear movement toward and away from the end. As shown, closure 20 is conically or frusto-conically shaped with its apex directed toward end 18 and positioned along the central axis 32 of the flow passage 30. The position of closure 20 relative to end 18 controls the flow of bulk material 40 through flow passage 30. Closure 20 may be positioned in sealing contact with end 18 to stop the flow through passage 30. The closure 20 may be selectively positioned away from end 18 to control characteristics of the flow of bulk material through passage 30. Flow characteristics may include the speed at which the bulk material flows through the passage, for example, to promote a consolidated, cohesive flow of the bulk material.

A conically or frusto-conically shaped closure 20 has several advantages. Only a short range of movement relative to end 18 is needed to stop or control the flow of bulk material through passage 30. Further such a closure is less prone to plugging or blockages like other closures such as slide gates. And there is less friction compared to other closures like slide gates. Further, if a bridge or blockage forms, the closure can be moved toward and away from end 18 to clear the blockage.

Additionally, in aspects, because the cone-shaped closure is located with its apex at the central axis of the flow passage it is also located at the center of the flow of the bulk material and when partially opened (e.g., moved in a direction away from the end 18), the closure slows down the flow in the center of the column of bulk material. The angle, length, and surface of the cone-shaped closure affect how much the bulk material is slowed down when partially open. The cone shape is also important because the pointed uppermost part of the cone shape is in the center of the column of flowing bulk material it acts to evenly slow down and separate the material and allow the material to move through the gap between the closure and the end 18.

Actuator 22 is operatively connected to closure 20 and is operated to move the closure 20 relative to end 18 to control the desired flow characteristics of the bulk material. Actuator 22 can be any device that is configured to cause a linear motion of the closure 20. For example, actuator 22 could be a hydraulic or pneumatic actuator or an electric linear actuator. Further actuator 22 may communicate position feedback data to be used to control its activation and positioning.

Sensor 24 is positioned and configured to measure the speed of the bulk material flowing through passage 30 without contacting the material. Preferably, sensor 24 is an optical linear displacement sensor that operates to measure the speed of a surface moving relative to the sensor. In an aspect, and as a non-limiting example, sensor 24 could be an ADNS-3080 Optical Flow Sensor Module. However, other non-contact linear displacement sensors that operate to measure the speed of a passing surface could be used. Additionally, machine vison using one or more cameras could be used to measure the speed of the bulk material flowing through passage 30.

The consolidated column of bulk material 40 flowing through passage 30 will be seen by sensor 24 as a continuous surface moving linearly in the passage. To this end, sensor 24 can measure the speed of the column of bulk material as it passes across a measurement point along the passage.

As representatively shown, tube 14 has a transparent window or section 34 in its sidewall. Sensor 24 is positioned exteriorly of tube 14 and aligned with window 34 so that the sensor has a clear optical view of the bulk material in passage 30. Preferably, sensor 24 is located 1.5 times the internal diameter of passage 30 above the closure to ensure the sensor can accurately measure the speed of the consolidated column of bulk material as it flows or moves through the passage. If sensor 24 is located too close to end 18, the sensor will not likely provide an accurate speed measurement because the consolidated flow of the bulk material will be disrupted in passage 30 near the position where the material exits end 18.

A dust cover 38 or enclosure can be provided to enclose sensor 24 and prevent it from becoming soiled by the operating environment of the device, which otherwise may interfere with its operation and accuracy.

Controller 26 can be a programmable logic controller and is operatively connected to actuator 22 and sensor 24. Controller 26 can be programmed to operate in various operational configurations or functions. In a primary aspect, controller 26 is programmed to receive data from sensor 24, and from this data determine a volumetric flow of bulk material through passage 30. For instance, the data received from sensor 24 can include information relating to the speed at which the consolidated column of bulk material is flowing through passage 30. Controller 26 can use this speed information to calculate the volumetric flow of the bulk material by using the known cross-sectional area of the passage at the location where the sensor measures the speed. And, if the density of the bulk material is known, a mass flow rate of the bulk material can be calculated from the calculated volumetric flow of the bulk material.

The calculated volumetric flow or mass flow of the bulk material 40 can be displayed on a display, such as a display of the user interface 28. In aspects the momentary flow rate (volumetric and/or mass) can be displayed and/or an average flow rate over time can be displayed.

In aspects controller 26 can be programmed to operate actuator 22 to position closure 20 to achieve the desired volumetric flow or mass flow rate of the bulk material 40. For example, controller 26 can be programmed to and/or operate actuator 22 to position closure 20 to achieve a desired consolidated, columnar flow of bulk material in tube 14 for measuring its flow rate. In aspects, controller 26 can be programmed to operate actuator 22 to position closure 20 to achieve a desired total volume or mass of bulk material dispensed from hopper 12 or the like. For example, controller 26 can be programmed to automatically operate actuator 22 to position closure 20 to achieve a desired periodic flow rate or a flow rate over time to reach a desired total discharge volume or mass of the bulk material.

In aspects, user interface 28 can communicate with controller 26. User interface 28 can be provided in many formats. For instance, as a non-limiting example, a user interface could be provided by a software application running on a computing device like a desktop or laptop computer, or by a software application running on a mobile device like a smartphone, tablet, or the like.

The user interface 28 may provide a location for a user to input data or commands to controller 26 as well as allow controller 26 to provide an indicator to the user. In a non-limiting example, user interface 28 may have a touchscreen. The touch screen may have a plurality of user-selectable inputs displayed thereon that allows the user to communicate an input preference to the controller 26. In other aspects, the user interface 28 may be buttons and switches among other things positioned on a dash and selectable by a user. The user interface 28 may provide indicators to the user regarding actions and observations of the actuator 22, the sensor 24, and/or the controller 26. User interface 28 may be configured to allow a user to manually operator actuator 22 to position the closure 20 to achieve a desired flow of the bulk material.

In aspects, device 10 may further include a vibrating device 36 that is operatively connected to structure 14 to induce a vibrational motion in the bulk material 40 in passage 30. The vibrating device 36 may be operatively connected to controller 26 and the controller may operate to control the operation of the vibrating device to meet desired flow characteristics of the bulk material in passage 30. For example, the vibrating device 36 may be operated to induce or promote a desired consolidated flow in the bulk material 40 in passage 30 by causing a vibrational force on the bulk material in the passage. In another example, the vibrating device may be operated to break up a blockage or bridge in the bulk material in passage 30.

While controller 26 is used throughout, the teachings of this disclosure may be implemented by any one or more controllers. More specifically, controller 26 can be any controller or combination of controllers capable of communicating with one or more of the actuator 22, sensor 24, vibrator 36, and user interface 28, or other sensors and/or controllers of equipment in which the device 10 is used in conjunction. Further, controller 26 may contain or otherwise have access to a processor for executing commands and a memory unit for storing algorithms, charts, measured values, sensor readings, threshold values, or any other data or the like. Accordingly, while a single controller 26 is illustrated, this disclosure contemplates using any known control device or combination of control devices to implement the logic and teachings discussed herein.

Figure 4:
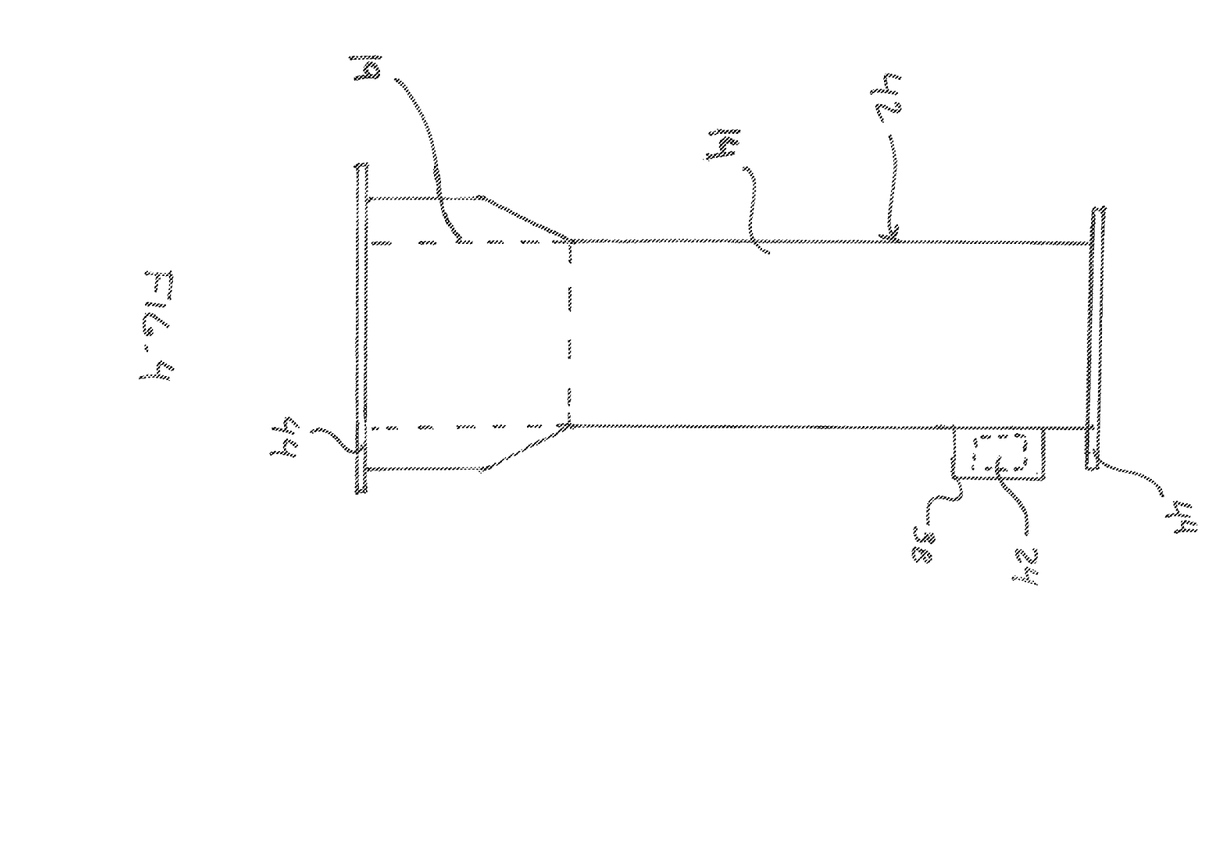
FIG. 4 is a schematic diagram illustrating an embodiment of an assembly including the bulk material flow measuring and metering device.

Device 10 may be packaged in an easily deployable assembly for implementing one or more of the devices in various types of equipment. In FIG. 4 there is diagrammatically illustrated an assembly 42. In an aspect, the assembly is configured to operatively house the various components of device 10 in a single, deployable package that can be easily connected to various equipment to measure and/or control bulk material flow in the equipment. In an aspect, the assembly 42 may include mounting flanges or surfaces 44 at opposite ends that provide connection points to the equipment. It is important to note that an assembly may take on various form factors as necessary depending on the equipment configuration in which the assembly is to be used in conjunction. Accordingly, the diagrammatically illustrated assembly as illustrated in FIG. 4 should not be considered limiting.

Figure 5:
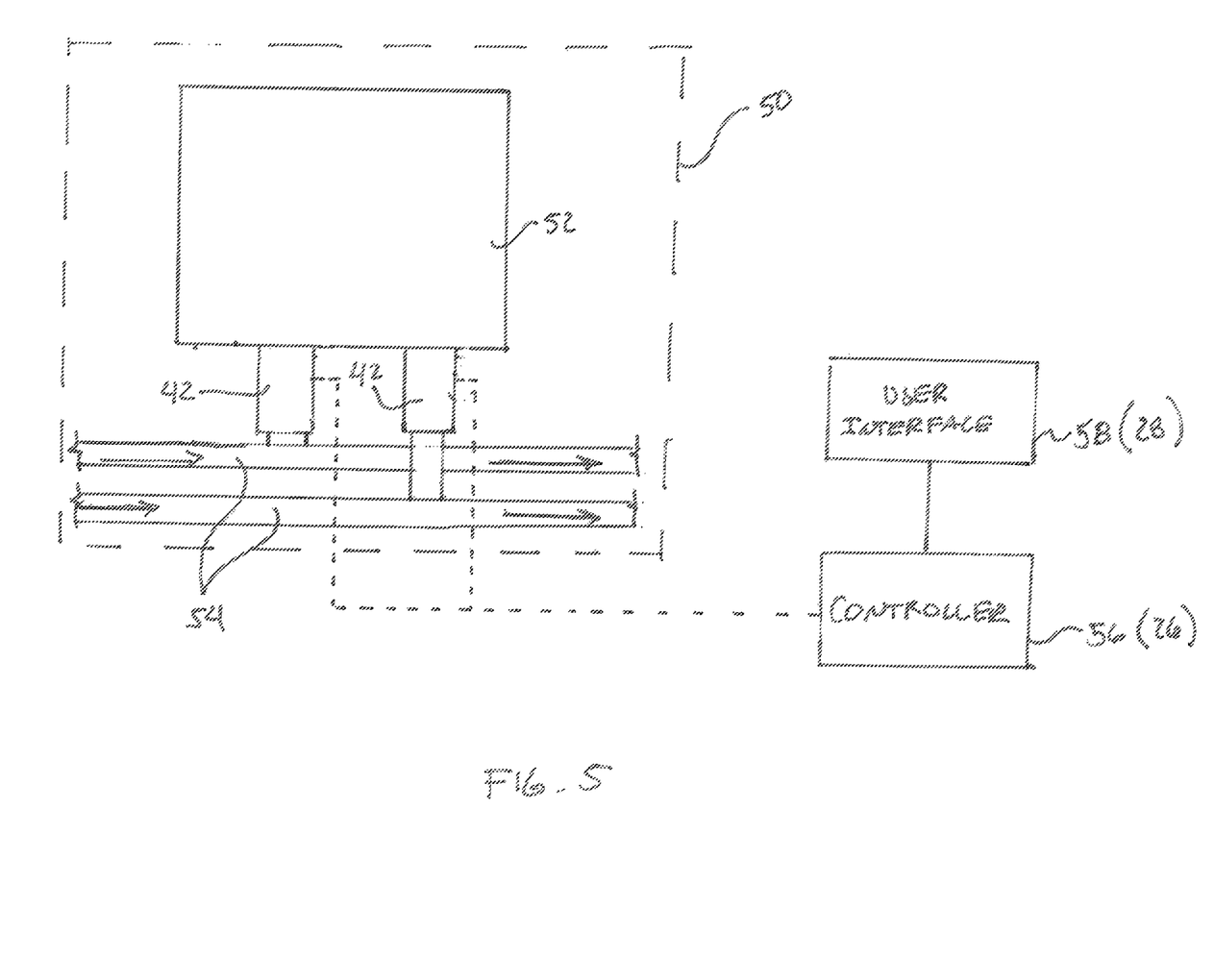
FIG. 5 is a schematic diagram illustrating an embodiment of an assembly including the bulk material flow measuring and metering device in use in conjunction with a piece of equipment.

In FIG. 5 there is a schematic illustration of an embodiment in accordance with this disclosure that shows multiple devices 10 in each provided in a separate assembly 42 being used with in connection equipment 50 to measure and meter a flow of bulk material in the equipment. As a non-limit example, equipment 50 could be agricultural equipment such as for example an air seeder or other type of seeder and/or fertilizer distribution equipment that is driven or towed across the ground to distribute the seed and/or fertilizer. These types of equipment are well known, and a complete illustration and discussion of such equipment are not necessary for an understanding.

As illustrated equipment 50 has a container 52 for holding a quantity of bulk material (i.e., seed and/or fertilizer) that is to be metered from the container into to one or more distribution lines 54 (representatively two) for discharging the material from the equipment. A plurality of devices 10 are provided with each as an assembly 42 and with each assembly connecting container 52 to one distribution line 54 to measure the flow rate and/or meter the flow of bulk material into the distribution lines. As further shown, each assembly 42 (containing device 10) is operably connected to communicate with controller 56. In such an implementation controller 56 could take the place of controller 26 on each device 10 or controller 26 on each device can be configured to connect with a master controller 56 when multiple devices are implemented together. Master controller 56 can have the same configurations and functional programming as discussed above. A user interface 58 can communicate with controller 56 and can be configured in the same way interface 28 discussed above.

To this end, each device 10 can be individually operated to measure a flow of bulk material from the container into a respective distribution line 54 and, if desired, operated to meter the amount of bulk material that is discharged from the container into a distribution line. Each device 10 can be controlled to meet the demand or desire of bulk material distribution by equipment 50. For example, variable rate and section control, which is a control methodology known in the field, could easily implemented in the control of each device as desired.

Deployment or use of device 10 is not limited to the illustrative examples discussed above and one or more devices can be used in many different applications with many different types of equipment wherein knowing the flow rate of a bulk material is desired and in certain applications metering the bulk material is desired.

Figure 6:
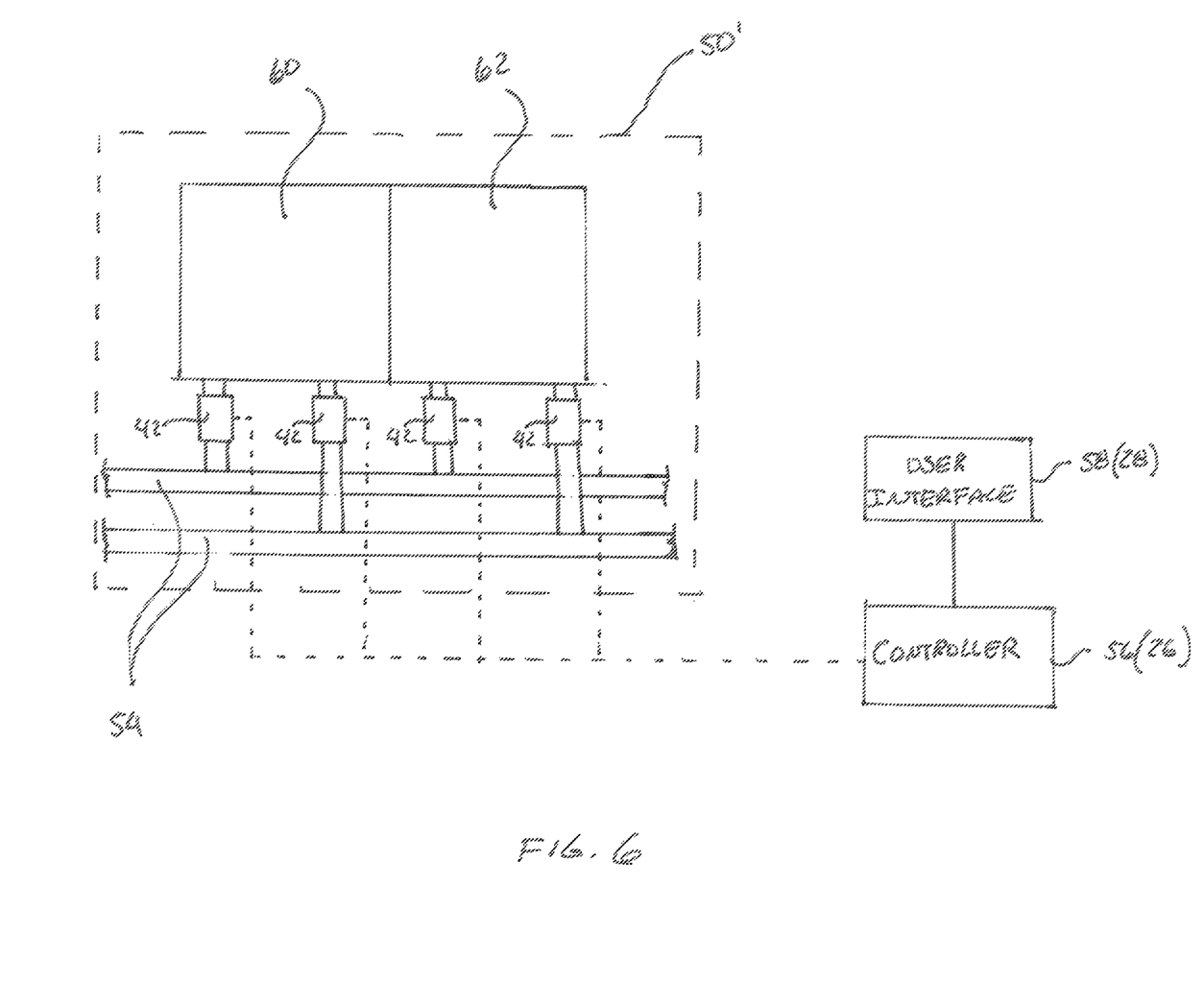
FIG. 6 is a schematic diagram illustrating an embodiment of an assembly including the bulk material flow measuring and metering device in use in conjunction with a piece of equipment.

In FIG. 6 there is a schematic illustration of an embodiment in accordance with this disclosure that shows multiple devices 10 in each provided in a separate assembly 42 being used with in connection equipment 50' to measure and meter a flow of bulk material in the equipment. Equipment 50' is like equipment 50 discussed above and but instead of a single container, equipment 50' can have multiple material containers, representatively containers 60 and 62. Each container 60 and 62 can hold a different type of material that can be metered into a flow line 54 (representatively two) for distribution by the equipment. The purpose of this illustration or embodiment is to highlight the scalability and flexibility of the device in its use with various types of equipment.

Figure 7:
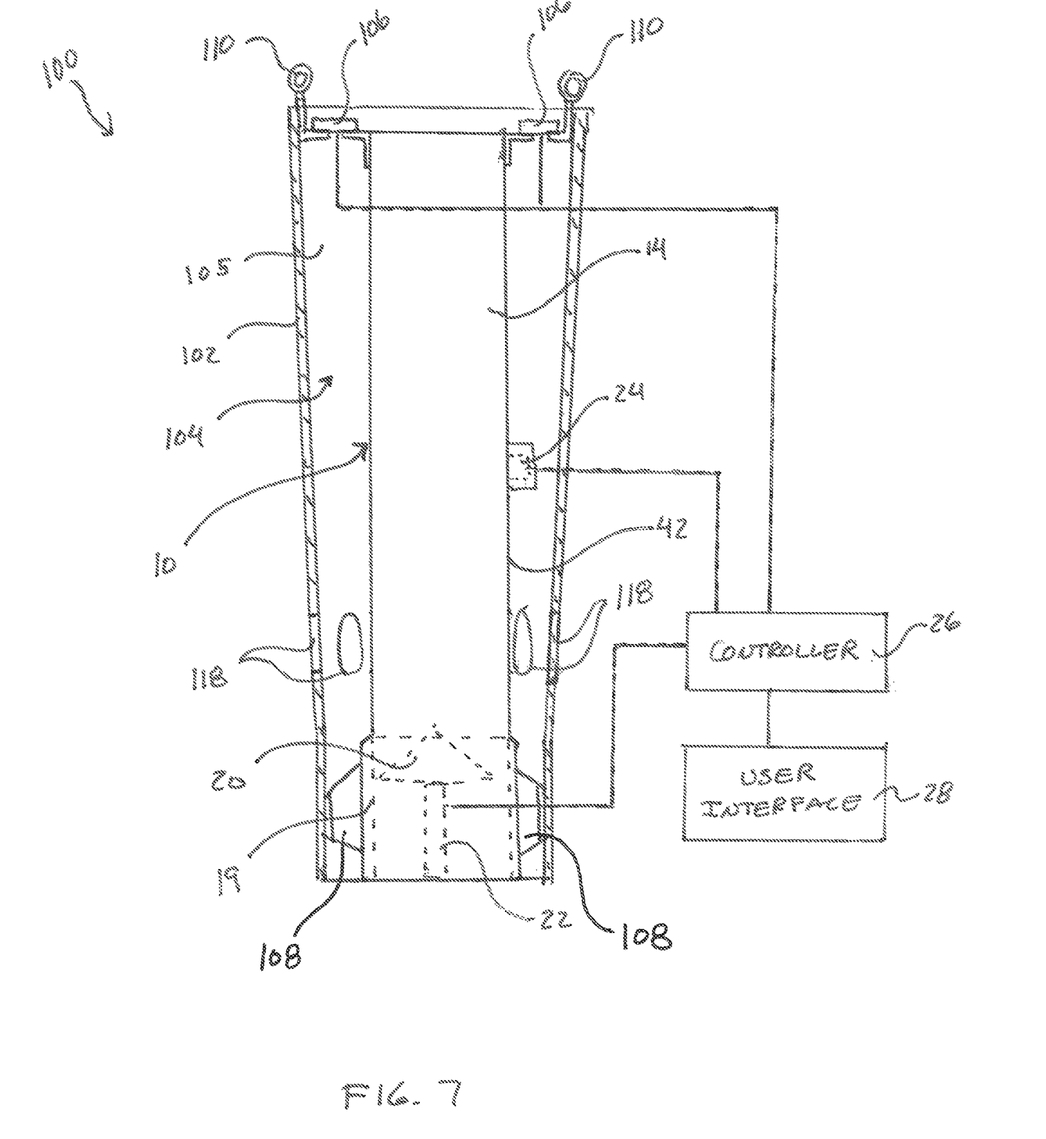
FIG. 7 is a schematic diagram illustrating an embodiment of a bulk material flow measuring and metering and density measuring device.

FIG. 7 is a schematic diagram illustrating an embodiment of a bulk material flow and density measuring device 100. Device 100 includes the bulk material flow measuring and metering device 10 discussed above and in addition to the functional aspects of device 10, it is configured to measure density of a bulk material.

As shown, device 100 includes a chute 102 having a flow passage 104 extending between its opposite open ends. Device 10, shown as assembly 42, is positioned within chute 102 forming an annulus 105 between device 10 and the interior surface of the chute. Assembly 42 is suspended, representatively at the top end of tube 14, in its position in chute 12 one or more load cells 106 that are connected to the chute and the tube and are radially spaced around the top end of the assembly. The lower end of assembly 42 can be centered in chute 102 by a plurality of shoes 108 that are fixedly attached to the assembly and movable relative to the interior surface of the chute. Alternatively, shoes 108 may be fixedly attached to the interior surface of the chute and movable relative to the exterior surface of the assembly. The upper end of chute 102 may have a plurality of lifting or suspension points 110 that allow the chute to be suspended and/or lifted from above.

A load cell 106 is an electro-mechanical sensor used to measure weight. Load cells are well known and a description of their structure and function are not necessary for an understanding here. One or more load cells 106 are operatively connected to controller 26 to receive data from the load cells. The data has information pertaining to a weight measured by the load cell. The controller 26 is programmed to receive this data from the load cell 106 and determine a weight measured by the load cell.

In an aspect, data from the load cells 106 would be received by controller 26. Controller 26, using this data, operates actuator 22 to open and close closure 20 to maintain the measured weight within a pre-determined range. This range is between 100% full to overflowing the passage 104, and a weight where the height or level of flowable granular solid is higher than the speed sensor 24. By using the information from the load cells 106 to control the positioning of the closure 20 via the actuator 22, the height or level of the top of the column of consolidated moving granular solids will always be above the speed sensor 24 and lower than the top of tube 14. Thus, all the flowable solids that pass through 100 would be volumetrically measured.

In addition to the functional aspects provided by device 10, discussed above, device 100 can be used to measure the density of bulk material. For example, controller 26 can be programmed to perform a density measurement function. In such a function, controller 26 operates actuator 22 to move closure 20 into the closed position wherein bulk material cannot flow through tube 14. Tube 14 is filled with bulk material to capacity and a weight measurement of the tube filled with the bulk material is taken. Using this weight measurement with the known volume of the tube when the closure is in the closed position, the density of the bulk material may be determined by the controller. The calculated density can be displayed on the user interface 28 and/or stored for use in additional calculations or in providing information to a user.

During the filling of tube 14 with bulk material any material overflow falls through chute 102 in the annulus 105 and is discharged through the bottom end of the chute. To this end, chute 102 capture and direct any bulk material overflowing tube 14 and direct the material overflow to the same location as if the material was flowing through device 10.

Device 100 has many applications. For example, device 100 could also be used on the discharge of grain augers when filling trucks or silos and measurement information (e.g., flow rate and/or material density) could be cross-referenced with truck scales and inventory systems to provide a total inventory system for a farm or commercial operation. In another example, anytime a grain auger is used to transfer granular bulk flowable solids device 100 can measure the volume and/or density of material transferred and send that information to an inventory control system. This system could be used to fill bins of a known size. The capacity of a bin could be entered. When the bin was almost full a visual or audible alarm would turn on to alert the operator or stop filling.

Figure 8:
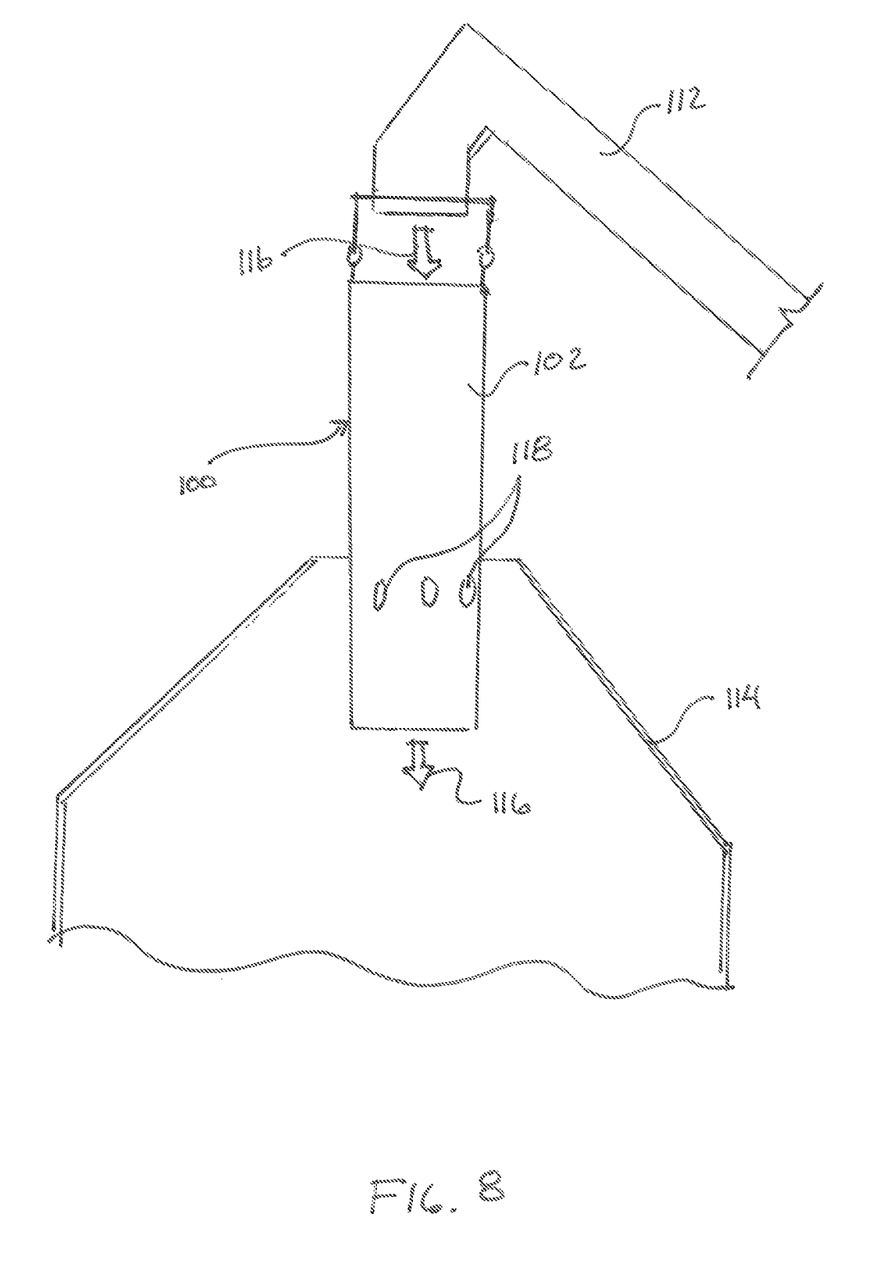
FIG. 8 is a schematic diagram illustrating an embodiment of an assembly including the bulk material flow measuring and metering device in use in conjunction with a piece of equipment.

FIG. 8 is a schematic illustration of an example use of device 100. As illustrated, device 100 is suspended from the discharge end of a bulk material elevator 112 (i.e., a grain elevator) and positioned in the fill opening of a silo or bin 114 that is to be filled with material from the elevator. Bulk material 116 discharged from elevator 112 is directed through device 100 and from the device into the interior of silo 114. Device 100 can be operated to measure the flow rate of the material into silo 114. Device 100 can also be operated to measure the density of the material in the manner described above.

As further shown, device 100 can have overflow holes 118 formed through chute 102 at a location that is positioned above the location of the closure. The overflow holes 118 allow material to continue to flow into the silo 114 in situations where the material has backed up into the device such as when the silo is almost full or when there is an operational error.

Deployment or use of device 100 is not limited to the illustrative examples discussed above and one or more devices can be used in many different applications with many different types of equipment wherein knowing the flow rate of bulk material and the density of the bulk material is desired. As a non-limiting example, device 100 could be used many different locations, such as under augers, in the flow path of flowable solids, in harvesting and processing machines, where measuring the volumetric flow of the flowable bulk material is desired and/or periodic density measurements are desired.

While the disclosure has been illustrated and described in detail in the drawings and foregoing description, such illustration and description are to be considered exemplary and not restrictive in character, it being understood that illustrative embodiments have been shown and described and that all changes and modifications that come within the spirit of the disclosure are desired to be protected. It will be noted that alternative embodiments of the present disclosure may not include all the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A volumetric flow measuring and metering device for flowable solids, the device comprising:
   a flow passage that is generally arranged vertically and has opposite open top and bottom ends through which a flow of bulk material may be passed;
   a speed sensor disposed to measure a speed of the bulk material flowing through the passage and output a data signal having information about a speed of the bulk material flow;
   an obturating device positioned at the bottom end of the flow passage and movable in a linear direction toward and away from the bottom end;
   an actuator operable connected to the obturating device and operable to selectively position the obturating device relative to the bottom end of the flow passage; and
   a controller, the speed sensor and the actuator operably connected to the controller and the controller operating to receive speed data from the speed sensor and to operate the actuator at least in part based on information contained in the speed data about the speed of the bulk material flowing through the passage.

2. The volumetric flow measuring and metering device of claim 1, wherein the flow passage has a sidewall with a section thereof provided with a transparent material, and the speed sensor disposed exteriorly of the flow passage in aligned with the transparent material such that the optical sensor can operate to measure the speed of the bulk material flowing through the passage.

3. The volumetric flow measuring and metering device of claim 1, wherein the flow passage has a circular cross-sectional area.

4. The volumetric flow measuring and metering device of claim 1, wherein the obturating device is conically or frusto-conically shaped and its apex is positioned along a central axis of the flow passage.

5. The volumetric flow measuring and metering device of claim 1, further comprising:
a vibrator operably connected to the flow passage and being operatable to impart a vibrational force in the bulk material flowing through the flow passage.

6. The volumetric flow measuring and metering device of claim 1, wherein the flow passage is provided by a cylindrically shaped tube.

7. The volumetric flow measuring and metering device of claim 1, wherein the speed sensor is an optical sensor.

8. The volumetric flow measuring and metering device of claim 7, wherein the optical sensor is an optical linear displacement sensor that operates to measure the speed of a surface moving relative to the sensor.

9. The volumetric flow measuring and metering device of claim 1, further comprising:
a user interface operably connected to the controller.

10. A volumetric flow measuring and metering device for flowable solids, the device comprising:
a cylindrical tube providing a flow passage of a circular cross-section and that is generally arranged vertically and has opposite open top and bottom ends through which a flow of bulk material may be passed;
an optical sensor disposed to measure a speed of the bulk material flowing through the passage and output a data signal having information about a speed of the bulk material flow;
an obturating device positioned at the bottom end of the flow passage and movable in a linear direction toward and away from the bottom end;
an actuator operable connected to the obturating device and operable to selectively position the obturating device relative to the bottom end of the flow passage;
a controller, the speed sensor and the actuator operably connected to the controller and the controller operating to receive speed data from the speed sensor and to operate the actuator at least in part based on information contained in the speed data about the speed of the bulk material flowing through the passage; and
a user interface operably connected to the controller.

11. The volumetric flow measuring and metering device of claim 10, further comprising:
a chute having a chute flow passage with open opposite ends;
one or more electrical load cells;
the one more electrical load cells connecting the tube to the chute such that the tube is suspended in the chute, and the load cells being operable to measure the weight of the tube; and
wherein the one more electrical load cells are operatively connected to the controller.

12. The volumetric flow measuring and metering device of claim 11, further comprising:
one or more overflow holes through the chute.

13. A method for measuring the volumetric flow of a bulk material comprising the steps of:
providing a flow passage that is generally arranged vertically and has opposite open top and bottom ends through which a flow of bulk material may be passed, a speed sensor disposed to measure a speed of the bulk material flowing through the passage and output a data signal having information about a speed of the bulk material flow, an obturating device positioned at the bottom end of the flow passage and movable in a linear direction toward and away from the bottom end, an actuator operable connected to the obturating device and operable to selectively position the obturating device relative to the bottom end of the flow passage, and a controller, the speed sensor and the actuator operably connected to the controller and the controller operating to receive speed data from the speed sensor and to operate the actuator at least in part based on information contained in the speed data about the speed of the bulk material flowing through the passage;
causing a flow of bulk material to flow in the flow passage in a consolidated, column-like flow by positioning the obturating device in a position relative to the bottom end of the flow passage such that the consolidated, column-like flow is induced in the bulk material flowing through the flow passage;
measuring the speed of the consolidated, column-like flow by the speed sensor and outputting a data signal having information about the measured speed; and
calculating a volumetric flow rate of the bulk material flowing through the flow passage by the controller by at least using the data signal from the speed sensor.

14. The method for measuring the volumetric flow of a bulk material of claim 13, further comprising the step of:
changing the position of the obturating device relative to the bottom end of the flow passage to either increase or decrease the volumetric flow rate.

15. The method for measuring the volumetric flow of a bulk material of claim 13, wherein the flow passage has a sidewall with a section thereof provided with a transparent material, and the speed sensor disposed exteriorly of the flow passage in aligned with the transparent material such that the optical sensor can operate to measure the speed of the bulk material flowing through the passage.

16. The method for measuring the volumetric flow of a bulk material of claim 13, wherein the flow passage has a circular cross-sectional area.

17. The method for measuring the volumetric flow of a bulk material of claim 13, wherein the obturating device is conically or frusto-conically shaped and its apex is positioned along a central axis of the flow passage.

18. The method for measuring the volumetric flow of a bulk material of claim 13, wherein the speed sensor is optical sensor is an optical linear displacement sensor that operates to measure the speed of a surface moving relative to the sensor.

19. The method for measuring the volumetric flow of a bulk material of claim 13, wherein a user interface is further provided and the user interface being operably connected to the controller and operating to display the calculated volumetric flow rate.

20. The method for measuring the volumetric flow of a bulk material of claim 13, wherein the flow passage is provided by a cylindrically shaped tube.

* * * * *